H. E. CHERRY.
WHEEL OF VEHICLES.
APPLICATION FILED OCT. 22, 1907.

948,042.

Patented Feb. 1, 1910.

WITNESSES:

INVENTOR:
Harold Edward Cherry,
By his Attorneys.

UNITED STATES PATENT OFFICE.

HAROLD EDWARD CHERRY, OF BURTON-UPON-TRENT, ENGLAND.

WHEEL OF VEHICLES.

948,042.  Specification of Letters Patent.  Patented Feb. 1, 1910.

Application filed October 22, 1907. Serial No. 398,651.

*To all whom it may concern:*

Be it known that I, HAROLD EDWARD CHERRY, of Trent House, Branston, Burton-upon-Trent, Staffordshire, England, malster, have invented certain new and useful Improvements in and Relating to Wheels of Vehicles, of which the following is a specification.

This invention relates to wheels of vehicles having tires formed of rope, leather or the like, and has for its object to provide means whereby said rope or leather may be wound on the periphery of the wheel and the ends suitably disposed and secured.

In accordance with this invention the wheel on which the tire is to be secured is provided with a flange on each edge to retain a rope in position when coiled on the periphery of the wheel, but not so deep as the thickness of the rope and the flange is continued in a spiral form to separate each turn of the rope. A gap is formed in each external flange to allow the ends of the rope to pass out, means being provided for securing said ends.

Figure 1:
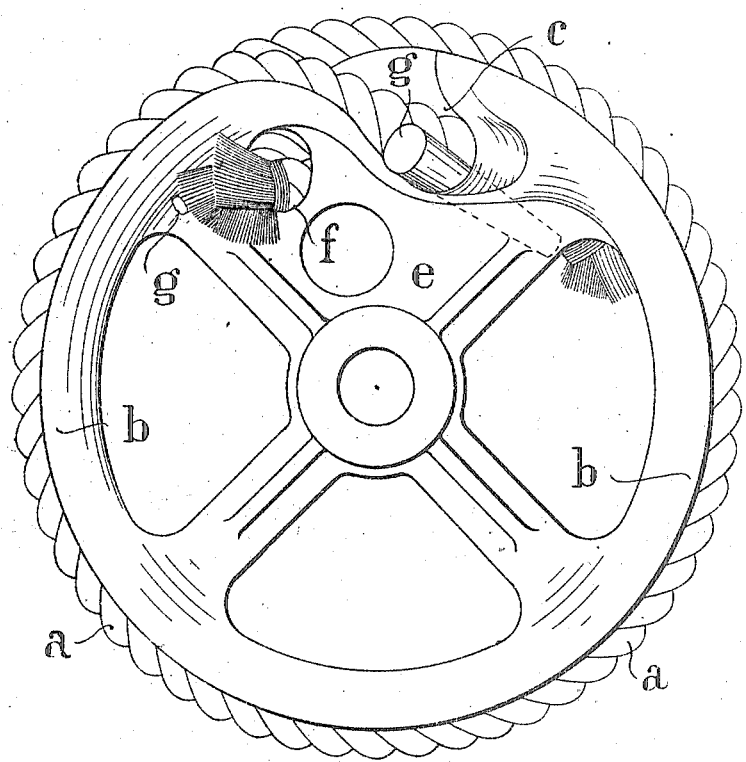
Figure 2:
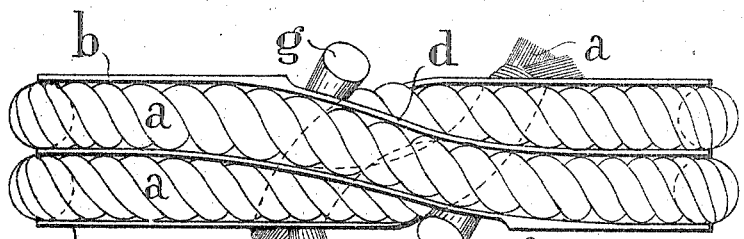

Referring now to the accompanying drawings, whereof Figure 1 is a side elevation of one form of wheel made in accordance with this invention and adapted for use on warehouse and like trolleys, and Fig. 2 is a plan thereof.

In the form of wheel shown the rope $a$ is adapted to make two complete turns on the periphery of the wheel.

$b\ b$ are external flanges each of which is provided with a gap $c$, and the flange is continued in a spiral form as at $d$ so as to separate each coil from the next and retain them in their correct position. Corresponding with the gaps $c\ c$ is a web $e$ provided with flanged poles $f, f$ through which the ends of the rope pass and in which they are secured by wedges $g\ g$. In use the ropes can be placed in position, drawn up tightly and securely fixed by driving in the wedges $g\ g$.

What I claim and desire to secure by Letters Patent is:—

1. In a wheel for vehicles, the combination of a wheel proper, a tire coiled around the rim thereof, a flange at each peripheral edge of said rim and a continuation of said flanges in spiral form around the periphery of said rim so as to form grooves whereby and wherein the tire is retained in position on the rim, gaps in said flanges and means for securing the ends of the tires, substantially as set forth.

2. In a wheel for vehicles, the combination of a wheel proper having a web and a rim, a tire coiled around said rim, a flange at each peripheral edge of said rim and a continuation of said flange in spiral form around the periphery of said rim so as to form grooves whereby and wherein the tire is retained in position on the rim, gaps in said flanges, flanged holes in said web through which the ends of the tire are passed and means for securing the ends of the tire, substantially as set forth.

3. A wheel for vehicles comprising a wheel proper, the periphery of which is formed with a rigid, unyielding channel disposed in general spiral form to provide a plurality of convolutions, and a flexible tire arranged in said channel.

4. A wheel for vehicles comprising a wheel proper, the periphery of which is formed with a rigid, unyielding channel disposed in general spiral form to provide a plurality of convolutions, and a flexible tire comprising a single length of material arranged in said channel.

5. A wheel for vehicles comprising a wheel proper, the periphery of which is formed with a rigid, unyielding channel disposed in general spiral form to provide a plurality of convolutions, the ends of said convolutions being directed inwardly toward the hub of said wheel, whereby the periphery of said wheel is substantially non-spiral in general form.

6. A wheel for vehicles comprising a wheel proper, the periphery of which is formed with a rigid, unyielding channel arranged in substantially spiral form to provide a plurality of convolutions, the spiral form of said channel being substantially confined to a single part of said periphery, and a flexible tire in said channel having its ends located at such part.

In witness whereof, I have hereunto signed my name in the presence of two subscribing witnesses.

HAROLD EDWARD CHERRY.

Witnesses:
 REGINALD EATON ELLIS,
 ROBERT MILTON SPEARPOINT.